United States Patent [19]

Suhadolnik et al.

[11] Patent Number: 5,445,872

[45] Date of Patent: Aug. 29, 1995

[54] LAMINATED THERMOPLASTICS STABILIZED WITH BISBENZOPHENONES

[75] Inventors: Joseph Suhadolnik, Yorktown Heights, N.Y.; James H. Botkin, Passaic, N.J.; Carmen Hendricks, White Plains, N.Y.

[73] Assignee: Ciba-Geigy Corporation, Ardsley, N.Y.

[21] Appl. No.: 191,573

[22] Filed: Feb. 3, 1994

Related U.S. Application Data

[63] Continuation of Ser. No. 29,211, Mar. 10, 1993, Pat. No. 5,306,456.

[51] Int. Cl.⁶ .................................................. B32B 27/18
[52] U.S. Cl. .................................. 428/215; 156/244.11; 264/171; 428/412
[58] Field of Search .................. 264/171; 156/244.11; 428/412, 228, 336, 212, 215, 332

[56] References Cited

U.S. PATENT DOCUMENTS

| | | |
|---|---|---|
| 3,043,709 | 7/1962 | Amborski . |
| 3,309,220 | 3/1967 | Osteen . |
| 3,487,505 | 1/1970 | Chisholm et al. . |
| 3,557,265 | 1/1971 | Chisholm et al. . |
| 3,580,927 | 5/1971 | Wear . |
| 3,666,713 | 5/1972 | Wear . |
| 4,353,965 | 1/1982 | Olson et al. . |
| 4,477,521 | 10/1984 | Lehmann et al. ............ 264/171 |
| 4,540,623 | 9/1985 | Im et al. . |
| 4,576,870 | 3/1986 | Liebler et al. ................ 264/171 |
| 4,668,588 | 5/1987 | Kishima . |
| 4,707,393 | 11/1987 | Vetter . |
| 4,776,913 | 10/1988 | Goosens et al. ............. 264/171 |
| 4,861,664 | 8/1989 | Goosens et al. . |
| 4,937,026 | 6/1990 | Goosens et al. . |
| 4,992,322 | 2/1991 | Gerry et al. . |
| 5,108,835 | 4/1992 | Hähnsen et al. . |

FOREIGN PATENT DOCUMENTS

| | | |
|---|---|---|
| 2002177 | 5/1990 | Canada . |
| 135115 | 2/1970 | Czechoslovakia . |
| 0110221 | 6/1984 | European Pat. Off. . |
| 0247480 | 12/1987 | European Pat. Off. ............ 264/171 |
| 0345884 | 12/1989 | European Pat. Off. . |
| 3739765 | 6/1989 | Germany ...................... 264/171 |
| 0443962 | 2/1969 | Japan . |
| 44-26456 | 11/1969 | Japan . |
| 45-12852 | 5/1970 | Japan . |
| 47-48888 | 12/1972 | Japan . |
| 52-93462 | 8/1977 | Japan . |
| 56-24418 | 3/1981 | Japan . |
| 57-12643 | 1/1982 | Japan . |
| 1245046 | 9/1989 | Japan . |
| 4-53883 | 2/1992 | Japan ........................... 264/171 |
| 1396240 | 6/1975 | United Kingdom . |
| 2137935 | 10/1984 | United Kingdom ............ 264/171 |

*Primary Examiner*—Jeffery R. Thurlow
*Attorney, Agent, or Firm*—Luther A. R. Hall

[57] ABSTRACT

Thermoplastic articles, preferably of polycarbonate, are advantageously stabilized by selected bisbenzophenone UV absorbers concentrated in the outer surface or coating layers of the article prepared by coextrusion techniques.

12 Claims, No Drawings

LAMINATED THERMOPLASTICS STABILIZED WITH BISBENZOPHENONES

This is a continuation of application Ser. No. 08/029,211, filed on Mar. 10, 1993, now U.S. Pat. No. 5,306,456, issued on Apr. 26, 1994.

This invention relates to an improved process for producing coated thermoplastic articles, preferably via coextrusion, wherein the coating layers contain selected bisbenzophenone UV absorbers, and to the stabilized articles thus produced.

BACKGROUND OF THE INVENTION

The use of various types of UV absorbers in the stabilization of polymers is well known. These stabilizers function by absorbing incident UV radiation and dispersing the absorbed energy in a nondestructive manner. Concentration of the UV absorber near the surface of the polymer to prevent penetration of UV light is, therefore, considered to be more efficient and economical than dispersion of the UV absorber throughout the bulk of the polymer.

The protection of aromatic polycarbonates from UV light is a particular problem as the polymer itself absorbs significant amounts of high energy light and is known to become quickly yellow and hazy. Aside from their strength and toughness, polycarbonates derive much of their value from their excellent optical properties, i.e. low color and high clarity. Therefore, protection against UV radiation at the surface of a polymer like polycarbonate, where most of the light would be absorbed, becomes vital.

It is of course obvious that any color imparted to the polymer composition by the stabilizer itself must be as little as possible.

A number of methods have been developed to concentrate UV absorbers near or at the surface of polymeric materials. These include surface impregnation (see U.S. Pat. Nos. 3,309,220, 3,043,709, 4,861,664 and 4,937,026) and coating a plastic article with solutions containing thermoplastic resins and UV absorbers (see U.S. Pat. Nos. 4,668,588 and 4,353,965). Both techniques suffer from significant drawbacks including requiring additional processing steps(i.e. applying, drying or curing), and encounter the difficulties associated with the handling of large processed articles. An additional drawback, particularly relevant to polycarbonate sheet production, is the detrimental effect such post addition treatment would have on the surface of the polymeric substrate.

Coextrusion is a well recognized method of producing laminated thermoplastic materials by simultaneously extruding various numbers of layers which form a single composite material. U.S. Pat. No. 4,540,623 describes coextruded materials of at least forty layers. Other methods produce as few as two or three different layers.

The resins employed in each layer may be the same, different e.g. polypropylene on polyacrylate on polycarbonate or be different types of similar resin such as two different aromatic polycarbonates.

Likewise, the types and amounts of additives employed in each layer may vary significantly. Typical additives include dyes, pigments, antioxidants, processing and UV stabilizers and glass fillers.

The use of coextrusion to produce a photo-stable article by incorporating a light absorbing layer at or near the surface of the laminate has received attention. Of particular importance is the protection of a polycarbonate core layer via such a process.

In EP 110,221, a polycarbonate core layer is protected with a thin polycarbonate layer which contains a high concentration of UV absorber. However, the UV absorbers used are volatile, especially under extrusion conditions, and loss and migration from the polymer composition may occur.

To prevent additive exudation, a third capping or barrier layer is incorporated which contains little or no volatile additive. In U.S. Pat. No. 4,707,393 a permanent layer of poly(methyl methacrylate) (PMMA) or PMMA composite is coextruded on top of the two polycarbonate layers. EP 345,884 describes the use of a removable barrier layer.

Recently, U.S. Pat. No. 5,108,835 teaches that the exudation problem of EP 110,221 can be overcome by incorporating certain low volatility bisbenzotriazole UV absorbers into the UV absorbing layer. These nonmigrating UV absorbers make the capping layer of U.S. Pat. No. 4,707,393 or EP 345,884 unnecessary. This process claims the advantages of simplified production and perhaps more importantly, improved UV and weather stabilization of the thermoplastic moldings produced.

Canadian Patent Appl. 2,002,177 discloses a special polymethacrylate coating for aromatic polycarbonate which may be applied via coextrusion. This coating could contain a wide variety of UV absorbers for photostabilization of the polymers. However, the focus of this patent is to provide polycarbonate compatible polymethacrylate and provides no guidance toward the selection of UV absorber. The specific class of bisbenzophenones of the instant invention is not discussed.

Many of the UV absorbers corresponding to the formula of the present invention are known. U.S. Pat. Nos. 3,580,927 and 3,666,713; Czechoslovak Patent Appl. 135,115; Japanese Patent Applns. Sho 47-48888 and Sho 44-26456; and British Patent 1,396,240 describe the preparation and general use as UV stabilizers of a variety of compounds where Z in the formula of the instant bisbenzophenones is hydrogen. Instant compounds where Z is halogen, alkoxy or alkyl are described in Japanese Patent Appl. Hei 1-245046 and alluded to in Japanese Patent Appl. Sho 45-12852.

Other, more specific uses for some of these bisbenzophenone compounds are described in Japanese Patent Applns. Sho 44-3962; Sho 57-12643; Sho 56-24418; Sho 52-93462 and Hei 1-245046. These uses include stabilizing polypropylene, but deal mainly with specific polyester applications.

Nowhere in the existing prior an is the use of the instant bisbenzophenones in a UV absorbing layer of a laminated article contemplated nor is any coextrusion process involving said compounds disclosed.

In only one case, Japanese Sho 57-12643, is any type of laminated article discussed. However in this case the core layer is stabilized with a xylylene bridged bisbenzophenone and the protective coating layer is a nonabsorbing water resistant copolyester-ether. A vague reference is made within this document to the core layer being a "composite film". However, the disclosure states and shows that the core layer must be a biaxially stretched UV stabilized film which is further coated. Such a coated film clearly cannot be produced via coextrusion.

Further, it was not obvious to apply these bisbenzophenone stabilizers to UV absorbing surface layers via coextrusion, or any other method. None of the prior art references foresaw the advantages that the use of these instant compounds provides in terms of better weathering and color development over the UV absorbers previously described. Specifically and most signficant is the improved weathering performance obtained by the use of these bisbenzophenone stabilizers over the bisbenzotriazoles described in U.S. Pat. No. 5,108,835 which is the current state of the art process.

The present invention offers an improvement over the existing prior art in that it not only provides the same simplification in production of photostabilized double walled thermoplastics found in U.S. Pat. No. 5,108,835, but also provides a laminated thermoplastic article with improved weathering resistance and lower color development than is currently available with the use of other classes of UV absorbers such as the bisbenzotriazoles.

This improvement in color and performance is particularly surprising since the bisbenzophenones of the instant invention and the bisbenzotriazoles of U.S. Pat. No. 5,108,835 demonstrate very similar color and weathering performance when incorporated via conventional bulk stabilization techniques into 125 mil (3.2 mm) thick plaques.

DETAILED DISCLOSURE

More specifically this invention pertains to a process whereby a multi-layered, coextruded thermoplastic article is produced, characterized by the incorporation into an outer UV absorbing coating layer of selected bisbenzophenone UV stabilizers of the formula

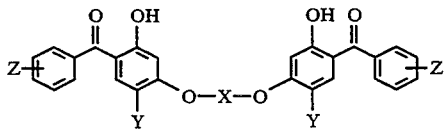

wherein
- X is a straight or branched chain alkylene of 1 to 16 carbon atoms, o-, m- or p-xylylene or an oxaalkanediyl of the formula —$CH_2CH_2[OCH_2CH_2]_n$—, —$CH_2CH(CH_3)[OCH_2CH(C_3)]_n$— or —$CH_2CH_2CH_2CH_2[OCH_2CH_2CH_2CH_2]_n$— where n is 1–4,
- Y is hydrogen, straight or branched chain alkyl of 1–18 carbon atoms, and
- Z is hydrogen, chloro, straight or branched chain alkyl of 1 to 18 carbon atoms or alkoxy of 1 to 18 carbon atoms.

Preferably, X is alkylene of 2 to 10 carbon atoms.
Preferably, Y is hydrogen or tert-butyl.
Preferably, Z is hydrogen, chloro, tert-butyl or methoxy.

Most preferably, X is alkylene of 3 to 10 carbon atoms and Y and Z are both hydrogen.

The bisbenzophenones of the instant invention are conveniently prepared by reaction of the alkali metal salt of a dihydroxybenzophenone with an alkylene dihalide or an aralkylene dihalide.

The application of surface layers via coextrusion takes place in a known manner in known coextrusion equipment as taught in U.S. Pat. Nos. 3,487,505 and 3,557,265.

The invention also relates to thermoplastic articles coated with a thermoplastic layer 0.1 to 10 mil (0.00254 mm to 0.254 mm), preferably 0.1 to 5 mil (0.00254 mm to 0.127 mm), thick, in which said layer contains 0.1% to 20% by weight of bisbenzophenone UV absorbers of the above formula. Preferred concentrations of UV absorber are 2% to 15% by weight; most preferred concentrations of 5% to 10% by weight.

The UV absorbers of the instant invention may be incorporated into the thermoplastics of the surface layer by standard methods such as dry mixing the additives with granular resin prior to extruding.

The UV absorbing layer may be applied to one or both sides of the thermoplastic article.

Laminated thermoplastic articles corresponding to the present invention which contain additional layers such as a water resistant layer as found in U.S. Pat. No. 4,992,322 are also within the scope of the present invention.

The core layer and the coating layer may be of the same thermoplastic resin or different thermoplastic resins. These resins include aromatic polycarbonates, polyesters, polyester carbonates, polyphenylene oxide, polyvinyl chloride, polypropylene, polyethylene, polyacrylates, polymethacrylates and copolymers and blends such as styrene and acrylonitrile on polybutadiene and styrene with maleic anhydride.

The preferred resins are polycarbonates based on dihydric phenols such as 2,2-bis-(4-hydroxyphenyl)propane (bisphenol A); 2,4-bis-(4-hydroxyphenyl)-2-methylbutane; 1,1-bis-(4-hydroxyphenyl)cyclohexane; 2,2-bis-(3-chloro-4-hydroxyphenyl)propane; 4,4′-sulfonyldiphenol; and 1,1-bis-(4-hydroxyphenyl)-3,3,5-trimethylcyclohexane.

Also preferred are polycarbonate copolymers incorporating two or more phenols, branched polycarbonates wherein a polyfunctional aromatic compound is reacted with the dihydric phenol(s) and carbonate precursor, and polymer blends of which polycarbonate comprises a significant portion of the blend.

The most preferred resins for both layers are polycarbonates based on bisphenol A.

Other conventional additives such as reinforcing agents and fillers, flame retardants, dyes, pigments, lubricants, and stabilizers added to protect the polymer during processing or against subsequent thermal degradation may also be present in either or both of the layers. Processing/thermal stabilizers include, for example, the hindered phenol antioxidants, organic phosphites, phosphates, phosphonates and thioethers.

The resulting stabilized polycarbonate compositions of the instant invention may optionally also contain from about 0.01 to about 5%, preferably from about 0.025 to about 2%, and especially from about 0.1 to about 1% by weight of various conventional additives, such as the materials listed below, or mixtures thereof.

When the thermoplastic resin is a polycarbonate or a polycarbonate copolymer, some of the coadditives listed below are to be avoided. These include antioxidants of group 1.3, group 1.6; 1-(3,5-di-tert-butyl-4-hydroxyanilino)-3,5-di(octylthio)-s-triazine and N,N′-hexamethylene-bis(3,5-di-tert-butyl-4-hydroxyhydrocinnamamide); light stabilizers of group 2.6; compounds of group 5 which are mercapto-benzimidazole, the zinc salt of 2-mercapto-benzimidazole and zinc dibutyl-dithiocarbamate; and compounds of group 6, group 7 and group 9.

1. Antioxidants 1.1. Alkylated monophenols, for example,
2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-i-butylphenol
2,6-di-cyclopentyl-4-methylphenol
-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol 1.2. Alkylated hydroquinones, for example,
2,6-di-tert-butyl-4-methoxyphenol
2,5-di-tert-butyl-hydroquinone
2,5-di-tert-amyl-hydroquinone
2,6-diphenyl-4-octadecyloxyphenol 1.3. Hydroxylated thiodiphenyl ethers, for example,
2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-bisphenols, for example,
2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl]terephthalate.

1.5. Benzyl compounds, for example,
1,3,5-tri-(3,5-di-tert-butyl-4-hydroxybenzyl)-2,4,6-trimethylbenzene
di-(3,5-di-tert-butyl-4-hydroxybenzyl)sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl)isocyanurate
1,3,5-tris-(4-tert-butyl-3-hydroxy-2,6-dimethylbenzyl)isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt 1.6. Acylaminophenols, for example,
4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate 1.7. Esters of β-(3,5-di-tert-butyl-4-hydroxyphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |

1.8. Esters of 13-(5-tert-butyl-4-hydroxy-3-methylphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |

1.9. Amides of β-(3,5-di-tert-butyl-4-hydroxyphenyl)-propionic acid for example,
N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine 2. UV absorbers and light stabilizers
2.1. 2-(2'-Hydroxyphenyl)-benzotriazoles, for example, the 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis-(α,α-dimethylbenzyl), 3'-tert-butyl-5'-(2-(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxycinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methylindoline.

2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methylphenyl undecyl ketoxime, nickel complexes of 1-phenyl-4-lauroyl-5-hydroxy-pyrazole, optionally with additional ligands.

2.6. Sterically hindered amines, for example bis-(2,2,6,6-tetramethylpiperidyl) sebacate, bis-(1,2,2,6,6-pentamethylpiperidyl) sebacate, n-butyl-3,5-di-tert.butyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1'(1,2-ethanediyl)-bis-(3,3,5,5-tetramethylpiperazinone), bis(1-octyloxy-2,2,6,6-tetramethylpiperidin-4-yl) sebacate.

2.7. Oxalic acid diamides, for example, 4,4'-di-octyloxyoxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstiuted oxanilides.

2.8. Hydroxyphenyl-s-triazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxyethoxy)phenyl]-6-(4-chlorophenyl)-s-triazine; 2,4-bis[2-hydroxy-4-(2-hydroxy-4-(2-hydroxyethoxy)phenyl]-6-(2,4-dimethylphenyl)-s-triazine; 2,4-bis[2-hydroxy-4-(2-hydroxyethoxy)-phenyl]-6-(4-bromophenyl)-s-triazine; 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydroxyphenylpropionyl)hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecylpentaerythritol diphosphite, di-(2,4-di-tert-butylphenyl)pentaerythritol diphosphite, tristearylsorbitol triphosphite, tetrakis-(2,4-di-tert-butylphenyl) 4,4'-diphenylylenediphosphonite.

5. Compounds which destroy peroxide, for example esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-bis(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocynurate, 1,1,3,-tris(2-methyl-4-hydroxy-5-tert-butylphenyl)butane, 1,3,5-tris[2-(3,5-di-tert-butyl-4-hydroxyhyctrocinnamoyloxy)ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)-hydrazide, and N,N'-bis[2-(3,5-di-tert-butyl-4-hydroxyhydrocinnamoyloxy)-ethyl]-oxamide.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-tri-methyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol or 2,2'-ethylidene-bis(4,6-di-tertbutylphenol).

The laminated thermoplastics produced in this invention may be used as is, e.g. double walled polycarbonate sheet, or further processed into finished articles.

The following examples are for the purpose of illustration only and are not to be construed to limit the nature or scope of the instant invention in any manner whatsoever.

EXAMPLES 1–4

The following examples demonstrate the superiority of the bisbenzophenones of the instant invention over the bisbenzotriazoles of U.S. Pat. No. 5,108,835 in a laminated polycarbonate plaque wherein the UV absorber is incorporated only into the thin surface protecting layer such as prepared in a coextruded article.

Laminated plaques are prepared by annealing a 1 mil (0.0254 mm) polycarbonate film (LEXAN® 141-111N), General Electric Co.) containing 5% by weight of an UV absorber to a non-UV stabilized 125 mil (3.18 mm) polycarbonate plaque (LEXAN® 141-111N) via compression molding in a Wabash Compression molder at 350° F. (177° C.) for three minutes at 1,000 psi (70 Kg/cm²), three minutes at 3,000 psi (210 Kg/cm²), and then three minutes at 3,000 psi (210 Kg/cm²) while cooling. The plaques are then exposed in an Atlas CI 65 Xenon Weatherometer, using the ASTM designation G26-88 Test Method C with the protective layer facing the incident light. Polymer degradation is determined by measuring yellowness index (YI) on an ACS spectrophotometer.

The following table shows the number of hours of exposure needed to reach a YI of 10. The data clearly demonstrate the pronounced superiority of the bisbenzophenones of the instant invention in this method of polymer stabilization versus the current status of the art.

| Example* | Hours to YI = 10 |
| --- | --- |
| 1 | 200 |
| 2 | 1350 |
| 3 | 1950 |
| 4 | >2000 |

*Example 1 is a control and contains no UV absorber in the protective layer.

Example 2 contains in the protective layer 5% of the bisbenzotriazole of U.S. Pat. No. 5,108,835 of the formula.

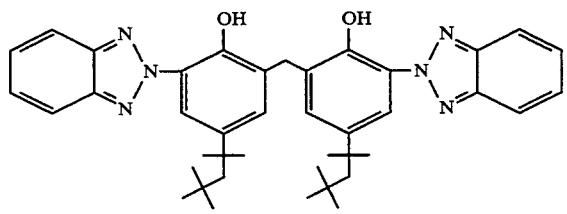

Example 3 contains in the protective layer 5% of the hexyl bridged bisbenzophenone of the following formula where n=6.

Example 4 contains in the protective layer 5% of the decyl bridged bisbenzophenone of the following formula where n=10.

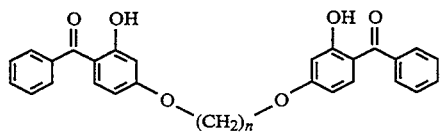

What is claimed is:

1. A stabilized multi-layered, thermoplastic article, prepared by a coextrusion process which process comprises coextruding a thermoplastic resin or mixture of thermoplastic resins to give a multi-layered thermoplastic article having an outer UV absorbing thermoplastic layer 0.1 to 10 mil (0.00254 to 0.254 mm) thick, which said outer UV absorbing layer contains 0.1 to 20% by weight of a bisbenzophenone UV absorber of the formula

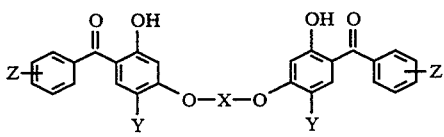

wherein
X is a straight or branched chain alkylene of 1 to 16 carbon atoms, o-, m- or p-xylylene or an oxaalkanediyl of the formula —CH$_2$CH$_2$[OCH$_2$CH$_2$]$_n$—, —CH$_2$CH(CH$_3$)[OCH$_2$CH(CH$_3$)]$_n$— or —CH$_2$CH$_2$CH$_2$CH$_2$[OCH$_2$CH$_2$CH$_2$CH$_2$]$_n$— where n is 1–4,
Y is hydrogen, straight or branched chain alkyl of 1–18 carbon atoms, and
Z is hydrogen, chloro, straight or branched chain alkyl of 1 to 18 carbon atoms or alkoxy of 1 to 18 carbon atoms.

2. A stabilized multi-layered, thermoplastic article according to claim 1 wherein X is alkylene of 2 to 10 carbon atoms.

3. A stabilized multi-layered, thermoplastic article according to claim 1 wherein Y is hydrogen or tert-butyl.

4. A stabilized multi-layered, thermoplastic article according to claim 1 wherein Z is hydrogen, chloro, tert-butyl or methoxy.

5. A stabilized multi-layered, thermoplastic article according to claim 1 wherein X is alkylene of 3 to 10 carbon atoms and Y and Z are both hydrogen.

6. A stabilized multi-layered, thermoplastic article according to claim 1 wherein the thermoplastic layer is 0.1 to 5 mil (0.00254 to 0.127 mm) thick.

7. A stabilized multi-layered, thermoplastic article according to claim 1 wherein said layer contains 2% to 15% by weight of the bisbenzophenone.

8. A stabilized multi-layered, thermoplastic article according to claim 7 wherein said layer contains 5% to 10% by weight of the bisbenzophenone.

9. A stabilized multi-layered, thermoplastic article according to claim 1 wherein the thermoplastic article and the coating layer are of the same thermoplastic resin or different thermoplastic resins.

10. A stabilized multi-layered, thermoplastic article according to claim 9 wherein the thermoplastic resin is selected from the group consisting of aromatic polycarbonates, polyesters, polyester carbonates, polyphenylene oxide, polyvinyl chloride, polypropylene, polyethylene, polyacrylates, polymethacrylates and copolymers and blends which are styrene and acrylonitrile on polybutadiene and styrene and maleic anhydride.

11. A stabilized multi-layered, thermoplastic article according to claim 10 wherein the thermoplastic resin is a polycarbonate based on a dihydric phenol selected from the group consisting of 2,2-bis-(4-hydroxyphenyl)-propane (bisphenol A); 2,4-bis-(4-hydroxyphenyl)-2-methylbutane; 1,1-bis-(4-hydroxyphenyl)cyclohexane; 2,2-bis-(3-chloro-4-hydroxyphenyl)propane; 4,4'-sulfonyldiphenol; and 1,1-bis-(4-hydroxyphenyl)-3,3,5-trimethylcyclohexane.

12. A stabilized multi-layered, thermoplastic article according to claim 11 wherein the thermoplastic resin for both the article and the coating layer is a polycarbonate based on bisphenol A.

* * * * *